United States Patent [19]
Sung et al.

[11] Patent Number: 5,677,720
[45] Date of Patent: Oct. 14, 1997

[54] METHOD AND APPARATUS FOR CONTROLLING PAPER CONVEYANCE OF AN ELECTROPHOTOGRAPHIC REPRODUCTION DEVICE

[75] Inventors: Moo-Kyung Sung, Ahnyang; Kee-Taek Kim, Seoul, both of Rep. of Korea

[73] Assignee: Samsung Electronics Co. Ltd., Suwon, Rep. of Korea

[21] Appl. No.: 248,086

[22] Filed: May 24, 1994

[30] Foreign Application Priority Data

May 24, 1993 [KR] Rep. of Korea .................. 8993/1993
Dec. 30, 1993 [KR] Rep. of Korea .................. 31787/1993

[51] Int. Cl.⁶ .................. B41J 2/47; B41J 2/435; G01D 15/14
[52] U.S. Cl. .................. 347/153; 347/262; 347/264
[58] Field of Search .................. 347/248, 104, 347/139, 153, 16, 262, 264; 346/136; 400/605; 358/296, 434, 448, 442

[56] References Cited

U.S. PATENT DOCUMENTS

| | | |
|---|---|---|
| 4,814,792 | 3/1989 | Yamanobe et al. .................. 347/248 |
| 4,924,320 | 5/1990 | Tanaka et al. .................. 347/104 |
| 4,998,133 | 3/1991 | Segawa . |
| 5,060,925 | 10/1991 | Hamakawa et al. . |
| 5,099,290 | 3/1992 | Yokota . |
| 5,197,723 | 3/1993 | Yamada et al. . |
| 5,258,779 | 11/1993 | Serizawa et al. . |
| 5,294,966 | 3/1994 | Shiokawa . |

FOREIGN PATENT DOCUMENTS

| | | |
|---|---|---|
| 41 32 847 A1 | 5/1992 | Germany . |
| P-2-266029 | 2/1990 | Japan . |
| 4-141469 | 5/1992 | Japan . |

*Primary Examiner*—Benjamin R. Fuller
*Assistant Examiner*—Raquel Yvette Gordon
*Attorney, Agent, or Firm*—Robert E. Bushnell, Esq.

[57] ABSTRACT

A method for controlling paper conveyance of an electrophotographic reproduction device which receives data to be printed from an external device through a data transmission medium comprises the steps of conveying a paper to a paper registration position upon initial reception of input data to be printed transmitted through a data transmission medium and conveying the paper to a transfer unit in the electrophotographic reproduction device for enabling received data to be printed on the registered paper when the received data reaches a set unit amount of data.

22 Claims, 6 Drawing Sheets

METHOD AND APPARATUS FOR CONTROLLING PAPER CONVEYANCE OF AN ELECTROPHOTOGRAPHIC REPRODUCTION DEVICE

CROSS-REFERENCE TO RELATED APPLICATIONS

This application makes reference to, incorporates the same herein, and claims all benefits incurring under 35 U.S.C. §119 for applications for Method And Apparatus For Controlling Paper Conveyance Of An Electrophotographic Reproduction Device filed in the Korean Industrial Property Office on 24 May 1993 and assigned Ser. No. 1993/8993 and 31 Dec. 1993 and assigned Ser. No. 1993/31787.

BACKGROUND OF THE INVENTION

1. Technical Field

The present invention relates to a method and apparatus for controlling paper conveyance in an electrophotographic reproduction device, and more particularly, to a method and apparatus for conveying a paper to a predetermined position for registration prior to reception of a print request and for performing a printing operation upon reception of a print request for the purpose of improving a printing speed of a page printer.

2. Background Art

Generally, electrophotographic reproduction devices such as copiers, printers, facsimile machines and other image reproduction devices reproduce an image in accordance with a print request signal and a page synchronization signal. Typically, these electrophotographic reproduction devices include a control unit and an engine unit. The control unit is commonly referred as a video controller served to reproduce an image on the basis of code data to be printed from an external device such as a host personal computer, a work station or alike and generates a print request signal when a set unit amount of print data is obtained. The engine unit, on the other hand, includes an engine control unit for controlling each portion of the printer, a feeding unit for controlling the feeding operation of the paper, a developing unit for electrophographically developing an image, a laser scanning unit for scanning the paper and a delivering unit for ejecting the printed paper. Both the control unit and the engine unit communicatively operate in synchronous with each other to perform a printing operation once the set unit amount of print data to be printed on the paper is obtained.

By way of example, a general structure of an electrophotographic reproduction device such as a laser beam printer (hereinafter referred to as "LBP") is disclosed in detail in U.S. Pat. No. 5,002,266 for "Sheet Feed Apparatus for Image Forming System" issued to Kikuchi et al., as well as in U.S. Pat. No. 4,998,133 for "Image Forming Apparatus With An Automatic Document Feeder" issued to Segawa. In both Kikuchi et al. '266 and Sagawa '133, a paper conveyance operation (i.e., feeding operation) does not begin until a print request signal is received. That is, the user must enter a print command and wait for the paper to be fed from a paper cassette into a paper registration position for registration prior to the actual printing. Thus, there is a delay between the time the user enter the print command and the time the printing is actually performed which is unnecessary and highly undesirable. Specifically, in Kikuchi et al. '266, the time delay for conveyance a paper to the position for printing is more than 10 seconds due to the fact that the sheet path length from the paper feed position (i.e., a position of the leading end of a paper in a paper cassette) to the paper registration position is considerably large.

Different electrophotographic reproduction devices such as ones disclosed in U.S. Pat. No. 5,060,925 for "Document Feeding Apparatus" issued to Hamakawa et al. and U.S. Pat. No. 5,197,723 for "Automatic Document Feeding Apparatus" issued to Yamada et al. which endeavor to reduce a feeding time between image reproduction by automatically and sequentially feeding successive documents of different sizes into a given position for printing during the period of exposure, the feeding operation is also dependent upon a print request from a user, thereby unnecessarily delaying the printing operation. Another variation on the same theme is in U.S. Pat. No. 5,099,290 for "Continuous Paper Printer With Monitoring Timer Period In Which The Paper Feed Speed Is Lower Than When Printing" issued to Yokota which reduces paper feeding rate between printing periods in a continuous-paper printer by setting a monitor time period for checking the readiness of a next set of print data while decreasing the speed of the paper transport drive roller lower to the speed of rotation used for a printing operation in order to prevent paper scorching or paper wastage from unnecessary feeding. Incidentally, Yokota '290 also discloses the concept of having the paper being fed to the transport driver rollers prior to the processing of print data in response to a power switch, the feeding operation is only applicable to the initial page of the continuous-paper. Thus, Yokota '290 is limited only in the context of a continuous-paper printer where the time element is not essential as to whether the print data is received or not.

Even in a more sophisticated electrophotographic reproduction device such as one disclosed in U.S. Pat. No. 5,258,779 for "Image Forming Apparatus With Means For Controlling Feeding Of Recording Medium" issued to Serizawa et al. where the paper feeder is although constructed to begin the feeding operation before the printing operation, still suffers similar deficiency as that of the previously mentioned feeding operation; that is, the feeding operation is also dependent upon the initial print request by a user. Further, although the feeding operation appears to be effective, I have found that it is unnecessarily complex and can be simplified.

SUMMARY OF THE INVENTION

It is therefore an object of the present invention to provide an improved method and apparatus for controlling paper conveyance so as to reduce unnecessary feeding time in performing a printing operation of a page printer.

It is still another object of the present invention to provide a method and an apparatus for effectively controlling paper conveyance of a page printer capable of eliminating unnecessary feeding time of a paper from a paper cassette into a predetermined position for registration and printing after a print request is provided by a user.

It is still yet another object of the present invention to provide a method and an apparatus for effectively controlling paper conveyance of a page printer by feeding a paper into a predetermined position for registration upon initial reception of input data to be printed on a paper and performing a printing operation only after a print request is provided by a user when received input data reaches a set unit amount.

According to one aspect of this invention, an electrophotographic reproduction device includes a control unit coupled to receive input data to be printed on a paper from an external device such as a host personal computer or a workstation, for generating a feeding request signal upon initial reception of the input data and for subsequently generating a print request signal when received data reaches a set unit amount of print data; and an engine unit for electrophotographically printing the input data received by the control unit on the paper and having devices for feeding the paper from a paper cassette into a predetermined position and registering the paper at the predetermined position in response to reception of the feeding request signal, and devices for printing the input data received by the control unit on the paper in response to reception of the print request signal.

According to another aspect of this invention, a method for controlling paper conveyance of an electrophotographic reproduction device which receives input data to be printed from an external device through a data transmission medium includes the steps of starting the feeding of a paper into a paper registration position upon initial reception of input data transmitted through a data transmission medium, and then printing received data on the registered paper when the received data reaches a set unit amount of print data.

BRIEF DESCRIPTION OF DRAWING

These and other objects, features, and advantages of the present invention are better understood by reading the following detailed description of the invention, taken in conjunction with the accompanying drawings. In the drawings, it should be noted that like elements represent like symbols or reference numerals, wherein.

DETAILED DESCRIPTION OF THE PREFERRED EMBODIMENTS

Figure 1:
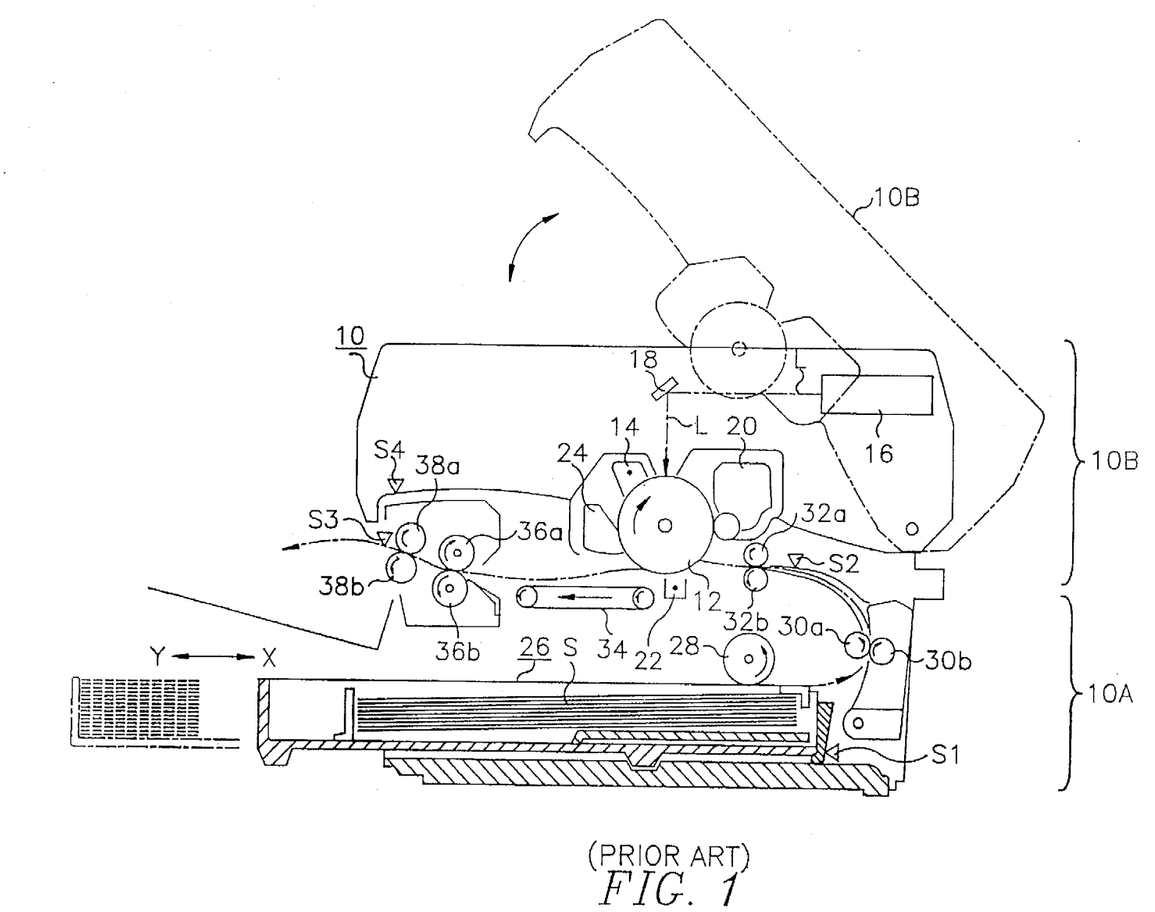
FIG. 1 illustrates a side view of a conventional page printer.

Turning now to the drawings, a conventional printer shown in FIG. 1 includes a housing 10 having a body 10A and a cover 10B. Cover 10B is pivotally mounted on body 10A and can be rotatably opened or closed relative to body 10A. A charger 14 forms a uniform charge on a photosensitive drum 12. A laser scanner unit 16 generates laser beam L corresponding to image data to expose photosensitive drum 12 through a laser reflecting mirror 18, thereby forming an electrostatic latent image on an outer surface of photosensitive drum 12. A developing unit 20 transmits developing material, such as toner, to the electrostatic latent image formed on photosensitive drum 12. A pick-up roller 28 (also known as a feed roller) picks up and feeds paper S stacked in a paper cassette 26 in response to a print request provided by a user. Feeding rollers 30a and 30b feed paper fed by pick-up roller 28 to register rollers 32a and 32b. Register rollers 32a and 32b arrange the paper fed by pick-up roller 28 and feeding rollers 30a and 30b for registration. A transfer unit 22 transfers developing material (i.e., toner) formed on photosensitive drum 12, onto the paper. A cleaner 24 removes residual toner from the surface of photosensitive drum 12 after the transfer of toner. A conveyor belt 34 then feeds the paper from transfer unit 22 to fixing rollers 36a and 36b. Fixing rollers 36a and 36b subsequently affix toner onto the paper. Fixing rollers 36a and 36b are heated by a heating lamp (not shown in FIG. 1) installed on the inside of the printer, to enable fixation of toner onto the paper. Delivery rollers 38a and 38b ultimately eject the image-formed paper to the exterior of the printer.

Figure 2:
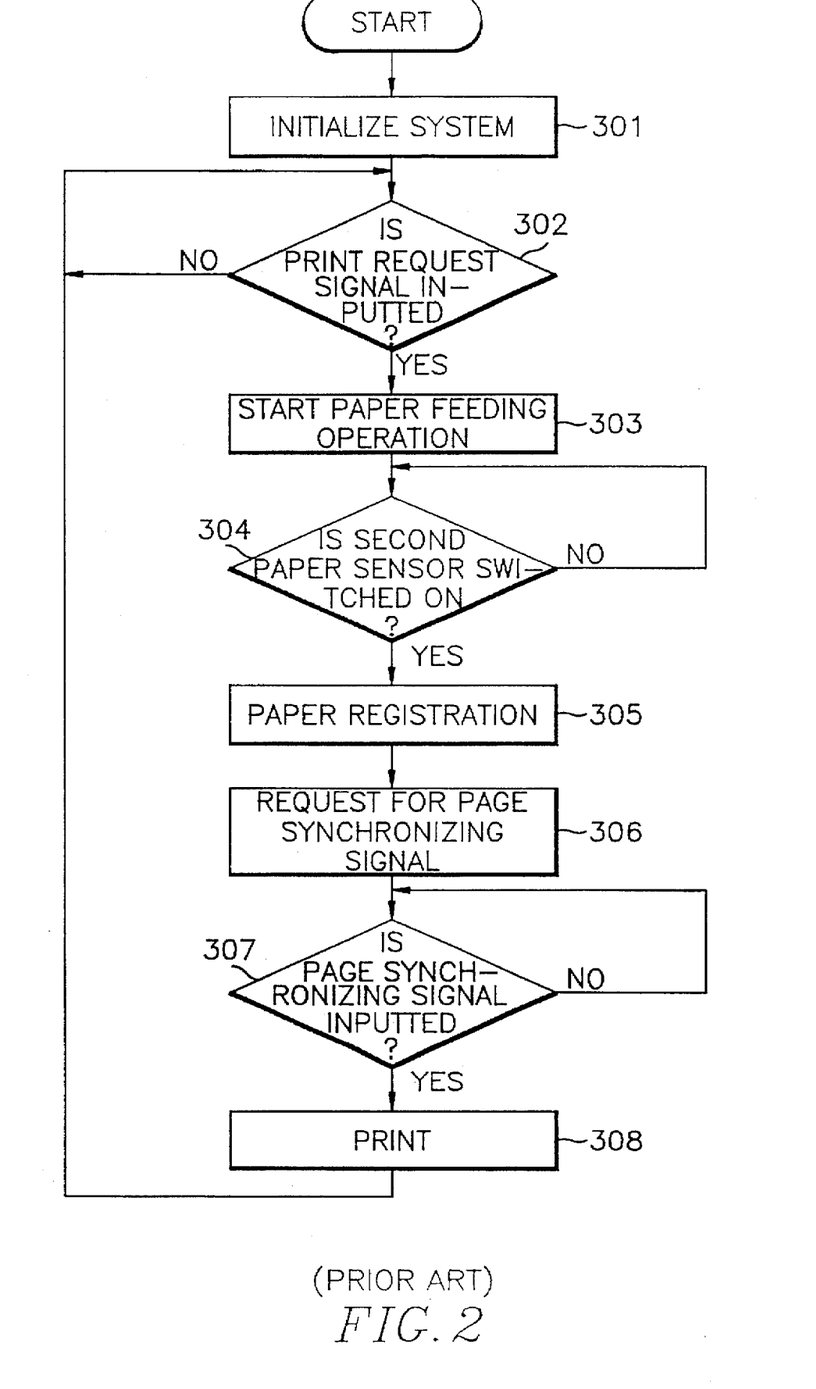
FIG. 2 is a flow chart showing a printing operation of a conventional page printer.

FIG. 2 is a flow chart showing a printing operation in response to a print request provided by a user via a control unit of the conventional page printer of FIG. 1. When the page printer of FIG. 1 is initialized to a printable state at step 301, it enters into a standby mode for checking whether data to be printed is input into the control unit from an external device such as a host personal computer and whether a print request signal is generated by the control unit in step 302. When the input data received by the control unit reaches a unit amount of print data, the control unit generates a print request signal and transmits the print request signal to the engine unit. Once the print request signal is received by the engine unit, the printer starts to feed the paper from the paper cassette 26 of FIG. 1 in step 303 and checks the status of the second paper sensor S2 in step 304. At this time, the photosensitive drum 12, the charger 14, the developing unit 20, the transfer unit 22, the exposure unit 16, and other components sequentially operate to drive an engine driving motor for conveying the paper from the paper cassette 26 into a proper position for registration with the registration rollers 32a and 32b. When the conveying paper passes through the second paper sensor S2, the second paper sensor S2 is switched on at step 304. Once the second paper sensor S2 is switched on, the paper is registered by the registration rollers 32a and 32b at step 306. On the basis of the time the paper reaches the second paper sensor S2, the clutch (not shown) of the registration rollers 32a and 32b is disabled, and thereby enabling the front edge of the paper to be registered at the registration rollers 32a and 32b.

Thereafter, the control unit and the engine unit are synchronized with each other in steps 306 and 307. That is, the control unit generates a page synchronizing signal to the engine unit for enabling the engine unit to start a printing operation in step 308. At this time, the clutch (not shown) of the registration rollers 32a and 32b operates to convey the paper to the transfer unit 22. Then, image data is output to the exposure unit 16. The exposure unit 16 exposes the light corresponding to the received image data to the photosensitive drum 12. The portion exposed to the photosensitive drum is developed by the toner from the developing unit 20. The image formed on the photosensitive drum 12 is transferred to the paper by the transfer unit 22. Then, the paper is continuously moved to the fixing rollers 36a and 36b and the toner on the paper is fixed by the heat of the fixing rollers 36a and 36b. When such an operation is terminated, the image-formed paper is delivered to the exterior of the printer by the delivery rollers 38a and 38b. Then, each portion of the engine unit sequentially deactivates and reverts back to step 302 to remain in a standby mode for checking whether a next print request signal is received.

Figure 3:
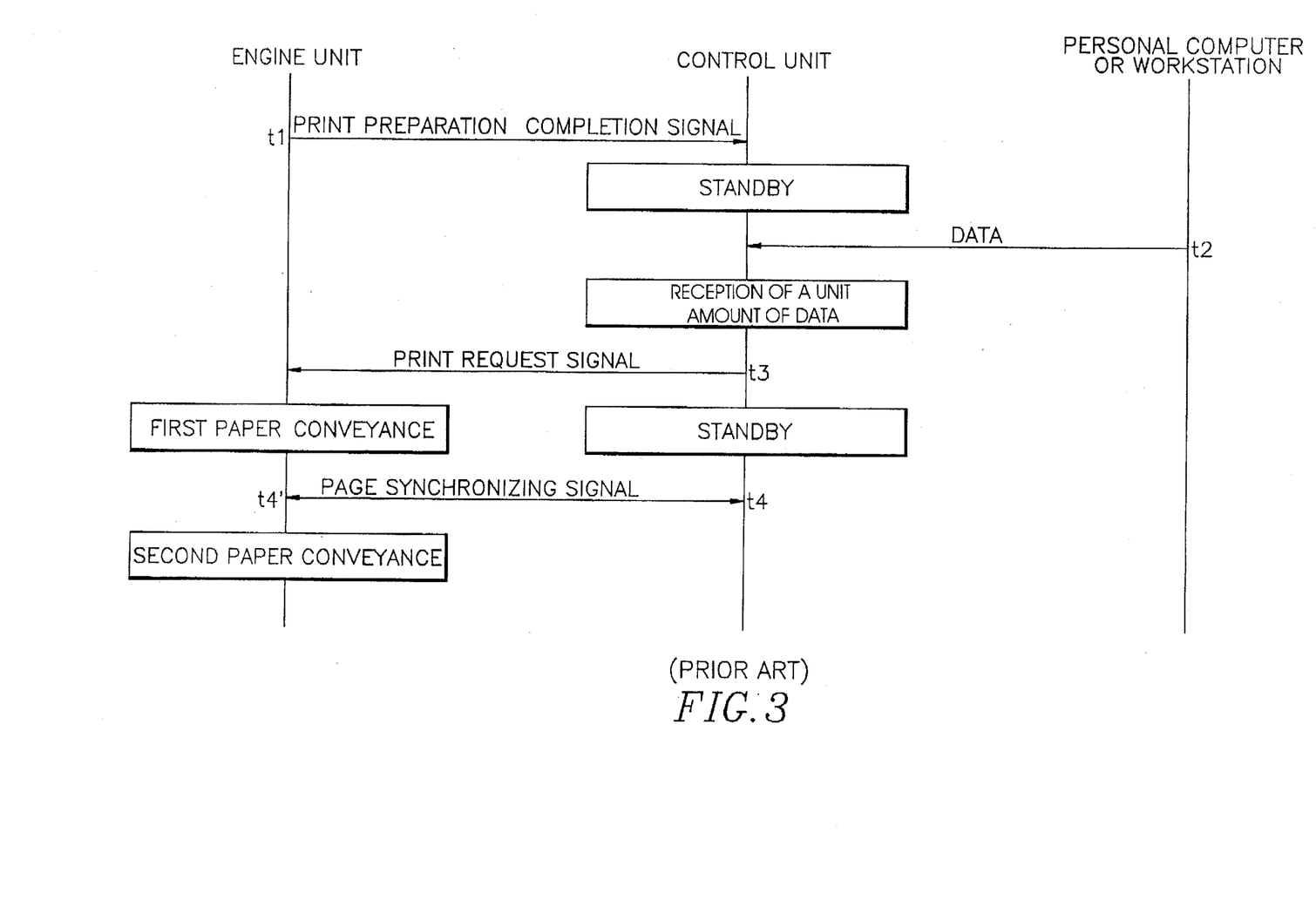
FIG. 3 is a time chart showing a printing operation of a conventional page printer in response to input data from an external device.

FIG. 3 is a time chart showing a printing operation of the conventional page printer shown in FIG. 2 with reference to the external device, the control unit and the engine unit. Specifically, at time t1, when the engine unit transmits a completion signal for informing the control unit to prepare for a printing operation, the control unit enters into a standby mode. At time t2, when the external device such as a personal computer or a work station transmits print data to the control unit, the control unit receives a set unit amount of data and transmits a print request signal indicative of a request for a printing operation to the engine unit at time t3. At this very moment, the engine unit pickups and conveys the paper to the registration rollers 32a and 32b of FIG. 1. This portion is referred to as a first paper conveyance. Since the second paper sensor S2 is switched on before the paper reaches the registration rollers 32a and 32b of FIG. 1, the engine unit and the control unit each send and receive the paper synchronizing signal with each other upon activation of the second paper sensor S2 in order to perform a second paper conveyance.

The time (i.e., from time t2 to time t3) when the control unit receives a unit amount of print data from an external device such as a host personal computer in order to generate a print request signal and then transmits the print request signal to the engine unit is generally about 10 seconds. This time delay is undesirable and highly inefficient as well as being a source of frustration and inconvenient for the user. While a response speed of a page printer for starting a printing operation may be reduced by different methods or means, it nevertheless remains as one of the problems that must be improved. In addition, the control unit must also wait for the engine unit to execute necessary steps to ensure proper synchronization with the control unit to set proper margin for a paper. For these reasons, I have observed that the conventional page printer is not only inefficient but may also give rise to an overload when performing the whole printing operation.

The following description sets forth specific details to provide a more thorough understanding of the present invention. It will be apparent however, to those skilled in the art that the present invention may be practiced without these specific details. In these instances, well-known circuits have not been described in order not to obscure the present invention. The page printer and the engine unit of the page printer shown in FIG. 1 with the indicated reference numbers, apply to the present invention and will be referred to in the following description.

Figure 4:
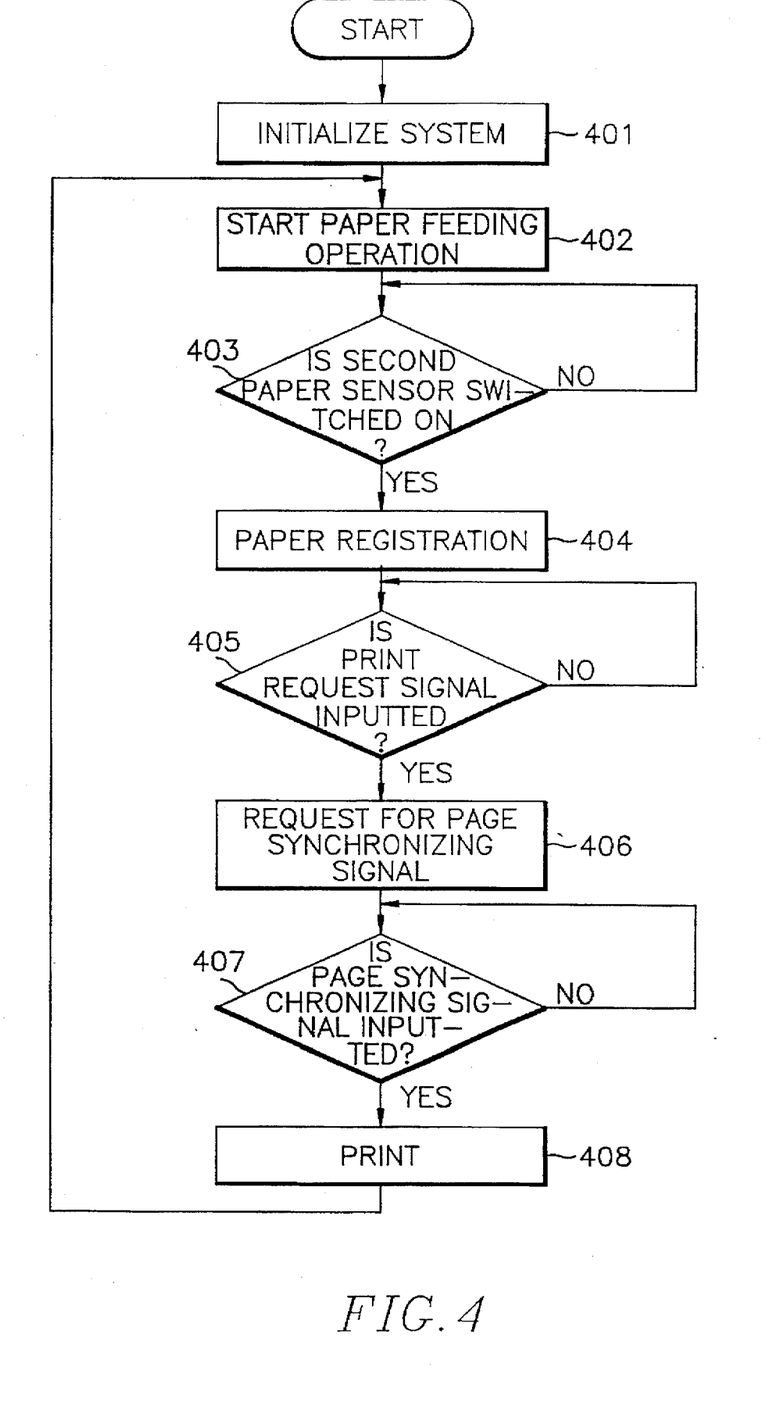
FIG. 4 is a flow chart showing a method for controlling paper conveyance in an engine unit of a page printer according to the present invention.

FIG. 4 is a flow chart showing a paper feed control process according to the principles of the present invention where it is contemplated that a paper is to be conveyed and registered prior to the receipt of a print request signal generated from a control unit so that a print operation can be performed in the engine unit as soon as the print request signal is received from the control unit, thereby eliminating the unnecessary delay time associated with a waiting time for the paper from a paper cassette 26 to be conveyed into a proper position for registration with the registration rollers 32a and 32b and subsequent printing operation.

In FIG. 4, a page printer is first initialized to a printable state at step 401. At step 402, in its engine unit, a paper is fed from the paper cassette 26 and the status of the second paper sensor S2 is checked at step 403. When the paper passes through the second paper sensor S2, the second paper sensor S2 is switched on. At this time, at step 404, the paper is registered with the registration rollers 32a and 32b. Thereafter, the printer enters into a standby mode for checking whether a print request signal is transmitted from the control unit to the engine unit at step 405. If the control unit receives input data to be printed from the external device up a set unit amount of print data (i.e., one full page) and converts the input data into print data, the control unit generates a print request signal and transmits the print request signal to the engine unit. When the engine unit receives the print request signal in accordance with the principles of the present invention, unlike a conventional process, the paper has already been registered by the registration rollers 32a and 32b, thus, the control unit and the engine unit can be quickly synchronized after the completion of step 405 for enabling a start of a printing operation in steps 406 and 407. That is, the control unit generates a page synchronizing signal to the engine unit, after the completion of step 405 during a unit amount of time, for enabling the engine unit to perform a printing operation in step 408 as mentioned previously. When such an operation is terminated, the control unit reverts back to step 302 and remains in a standby mode after the paper is fed and registered for responding to input of a next print request signal.

As described above, in an engine unit, the paper is fed prior to the receipt of the print request signal generated from a control unit so that the printing operation can be implemented immediately after reception of the print request signal without having to suffer any unnecessary time delay. Thus, according to this preferred embodiment as mentioned above, a printing speed can be greatly improved. In accordance with the present invention, the saved time delay is a time the paper travels from the paper cassette 26 to the registration rollers 32a and 32b for registration. The distance between the paper cassette 26 and the registration rollers 32a and 32b remains a significant factor. Thus, the longer the distance between the paper cassette 26 and the registration rollers 32a and 32b, the greater the delay time saved by the present invention. It should be noted however that the first preferred embodiment is designed of reducing the paper registration time for the paper to travel from the paper cassette 26 to the registration rollers 32a and 32b regardless of the actual distance between the paper cassette 26 and the registration rollers 32a and 32b. If the paper is always fed in the standby state however, the paper may remain in a curled state for a long time which could deteriorate the overall printing performance of the paper. Further, much frustration and inconvenience associated with the print operation still remain if the printer is not immediately driven after a user issues a print request.

Figure 5:
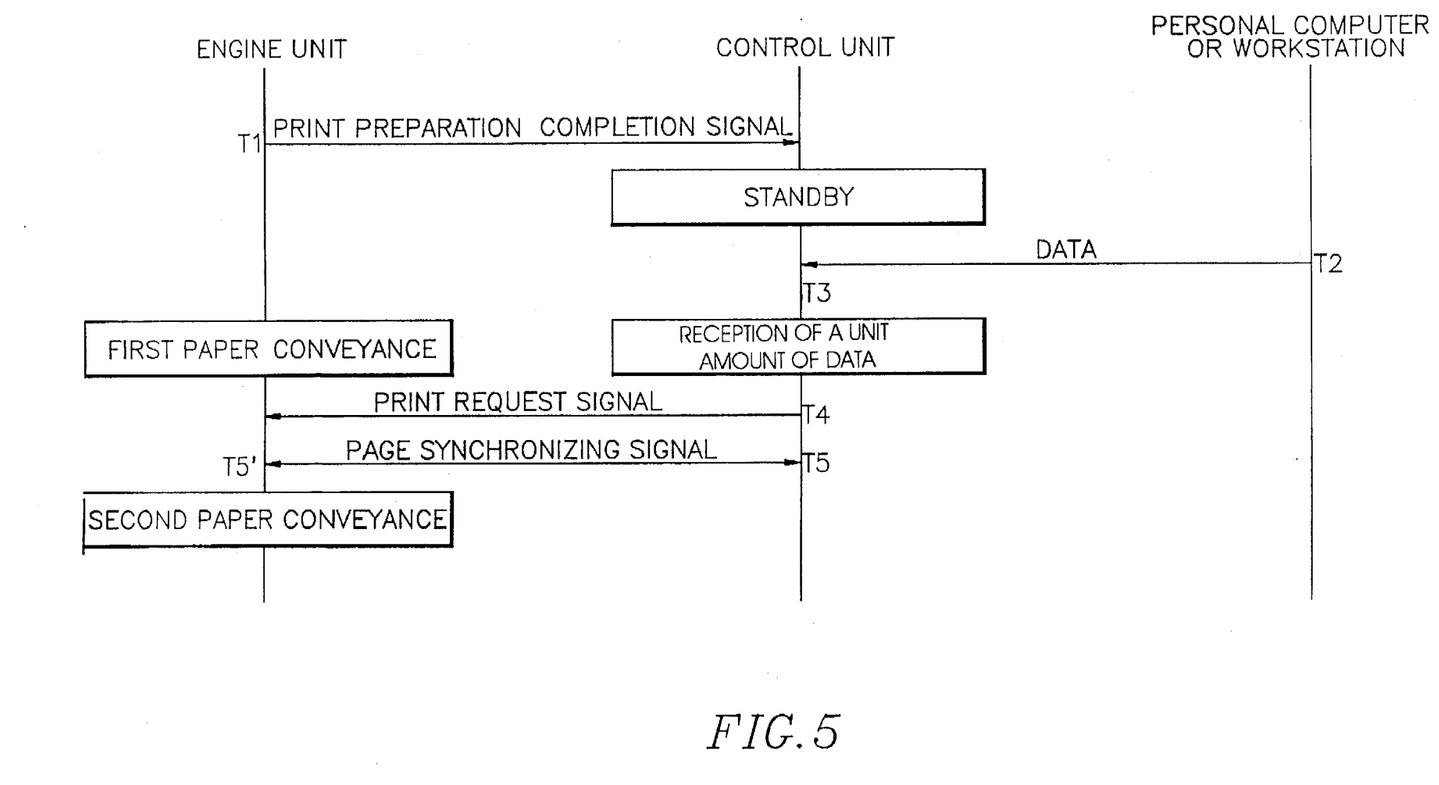
FIG. 5 is a time chart showing one preferred printing operation of a page printer according to the present invention.

FIG. 5 is a time chart showing one preferred printing operation of a page printer according to the present invention with reference to a method for controlling paper conveyance based on the relationship between the external device, the control unit and the engine unit of the page printer as shown in FIG. 1. Referring now to FIG. 5, the conveyance for registering the paper is initiated synchronously at the time when the control unit is initialized in a standby mode. Each time period and its corresponding operation will be in detail explained hereinafter.

The engine unit informs the control unit that the print operation can be performed if no error state has been found through its own determination (time T1). The control unit waits until the data to be printed is input from an external device such as a host personal computer or a workstation at time T2 after the paper is fed from a paper cassette 26 into a proper position for registration with registration rollers 32a and 32b using the pick-up roller 28 and the feeding rollers 30a and 30b. At time T3, when the paper is fed to the registration position and remains waiting for reception of a print request signal provided from the control unit at time T4 when an appropriate amount of print data is received by the control unit. Then, the page synchronizing signal is exchanged between the control unit and the engine unit at times T5 and T5' for enabling the printer to set the margin of the printing operation. As a result, if synchronization is set between the control unit and the engine unit, the engine unit begins to transport the registered paper to the transfer unit 22 using the registration rollers 32a and 32b for performing a printing operation. That is, data is to be printed on the paper by the transfer unit 22. Subsequently, the printed paper is ejected to the exterior of the printer by the delivery rollers 38a and 38b.

Figure 6:
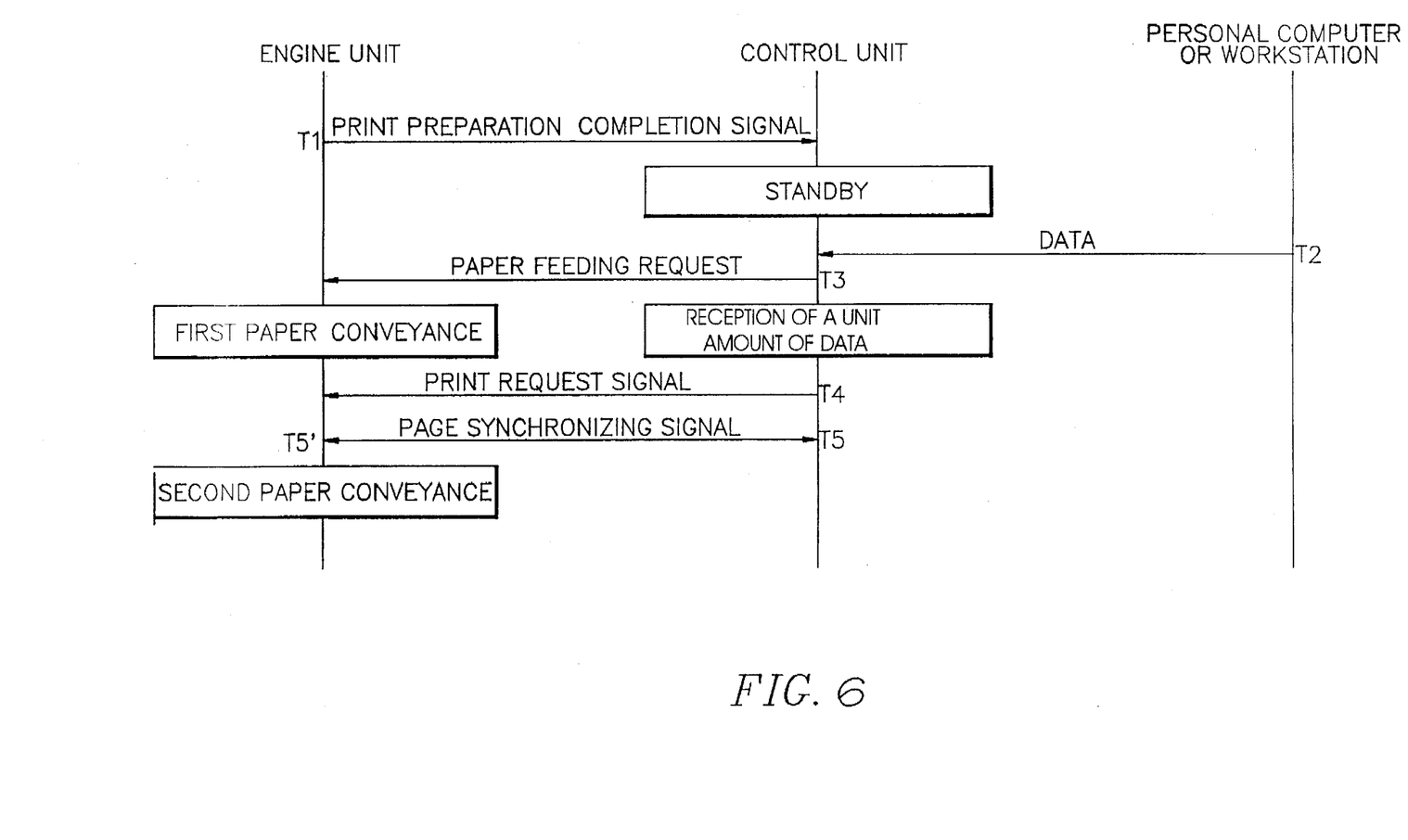
FIG. 6 is a time chart showing another preferred printing operation of a page printer according to the present invention.

Similarly, FIG. 6 is a time chart showing another preferred printing operation of the present invention with reference to a method for controlling paper conveyance based on the relationship between the external device, the control unit and the engine unit of the page printer as shown in FIG. 1. Referring now to FIG. 6, the conveyance for registering the paper is initiated synchronously at the time when the control unit generates a paper feed request signal after being initialized in a standby mode. Each time period and its corresponding operation will be in detail explained hereinafter.

The engine unit informs the control unit that the print operation can be performed if no error state has been found through its own determination (time T1). The control unit waits until the data to be printed is input from an external device such as a host personal computer or a workstation. At time T2, when the external device starts to transmit the data to be printed to the control unit, the control unit immediately transmits a paper feeding request signal to the engine unit at time T3 in order to enable the engine unit to feed the paper from a paper cassette 26 into a proper position for registration with registration rollers 32a and 32b using the pick-up roller 28, the feeding rollers 30a and 30b. That is, the paper is fed to the registration position and remains waiting for reception of a print request signal provided from the control unit. During this paper conveyance operation, the control unit continues to receive the data to be printed from the external device. Once the data received reaches an appropriate unit, the control unit generates a print request signal to the engine unit at time T4 for subsequently enabling exchange of the page synchronizing signal between the control unit and the engine unit at time T5 and T5' in order to set the page margin of the printing operation. The difference between FIG. 5 and FIG. 6 is that FIG. 6 is designed to avoid the potential problem associated with the possible overheating of the paper if the paper is always fed in the standby state as shown in FIG. 5. FIG. 5 is however desirable continuous printing is required.

Improvements on a printing speed through novel processes as mentioned above will be easily understood with reference to the following description. Assuming that the time necessary for receiving input data of an amount of one page is about 10 second, the time necessary for registering the paper is about 10 second, and the time necessary for printing substantially after completing the paper registration is about 20 second in the conventional page printer as described in FIG. 3, when adding the time taken from time t2 when the print data is transmitted from an external device to the control unit to the time when the printing is terminated, it takes about 40 second to perform a printing operation. On the contrary, in the present invention as described in FIG. 5, when adding the time taken from time T2 when the print data is transmitted from the external device to the control unit to the time when the printing is terminated, it takes only 30 second to perform a printing operation. Further, even in the event of the preferred embodiment of FIG. 4, about 30 second elapses from the time when the print request by a user is generated to the time when the printing operation is completed. Thus, the time frame for performing the printing operation is reduced in comparison with the conventional page printer.

As discussed above, the present invention has an advantage capable of reducing a printing time for as much as the time the paper is fed and registered by feeding and registering the paper immediately upon receipt of the input data to be printed on the paper from an external device. Further, the present invention has an advantage capable of improving a printing speed since the input data to be printed transmitted through a data transmission medium is immediately transferred onto the paper without having to necessarily feed the paper into a proper position for registration since registration has already been established. In addition to such advantages, the present invention has advantages capable of removing unnecessary waiting time associated with the paper registration prior to the actual printing and thereby providing an optimum satisfaction level to the user since a visible printing operation such as the feeding of the paper for registration is immediately executed upon receipt of a print request provided by a user.

While the above description and the accompanying figures are considered to represent the preferred embodiment of the present invention, it will be apparent to those skilled in the art that various changes and modifications may be made therein without departing from the spirit and scope of the present invention as defined in the appended claims. An example of the present invention is applied to a specific printer, but it is possible to apply the present invention to a plain paper PP facsimile or any device using the electrophotographic developing process.

What is claimed is:

1. An apparatus for controlling paper conveyance of an electrophotographic reproduction device, comprising:

control means for receiving print data that is printed, for generating a paper feeding request signal upon initiation of reception of said print data, and generating a print request signal in response to completion of reception of said print data; and engine means for electrophotographically printing said print data received by said control means on a printable medium in response to said print request signal, said engine means comprising:

means for conveying said printable medium from a cassette to a predetermined position and registering the printable medium at said predetermined position in response to reception of said paper feeding request signal but before the generation of said print request signal; and means for printing said print data to be printed on the printable medium upon reception of said print request signal.

2. The apparatus of claim 1, further comprised of said print data to be printed on said printable medium being transmitted from a personal computer.

3. The apparatus of claim 1, further comprised of said print data to be printed on said printable medium being transmitted from a workstation.

4. The apparatus of claim 1, further comprised of said electrophotographic reproduction device being a laser beam printer.

5. A method for controlling paper conveyance of an electrophotographic reproduction device comprising a control unit for receiving print data to be printed and for generating a print request signal when the print data received reaches a set unit amount of said print data, and an engine unit having means for conveying a printable medium from a cassette to a predetermined position and registering the printable medium at said predetermined position, and means for printing received print data on the printable medium, comprising the steps of:

initializing said device to place said device in a state of readiness to print on the printable medium;

generating a request to convey the printable medium within said device upon initiation of reception of said print data;

feeding a first sheet of the printable medium from said paper cassette to said predetermined position and registering said printable medium at said predetermined position after said initializing of said device;

generating a print request signal when said control unit has received said set unit amount up to one full page of said print data;

synchronizing said control unit and said engine unit;

printing said print data on the printable medium in response to reception of said print request signal;

feeding and registering a second sheet of the printable medium from said paper cassette, for performing a next printing operation; and generating said print request signal when said control unit has again received said set unit amount up to one full page of said print data.

6. A method for controlling paper conveyance of a page printer having a paper cassette for storing paper, a pickup roller for picking up the paper stored in said paper cassette to convey the paper, registration rollers for registering the paper conveyed by said pickup roller, a paper sensor installed between said pickup roller and said registration rollers for sensing a conveyance state of the paper, and a control unit for receiving data to be printed from an external device and generating a print request signal, said method comprising the steps of:

generating a request to convey the paper from said paper cassette and to within said page printer upon initiation of reception of said data to be printed;

feeding a paper from said paper cassette to convey the paper to a registration position when said page printer is initialized to a state of readiness to print images upon the paper;

registering the paper with said registration rollers by stopping rotation of said registration rollers in dependence upon detection of the paper by said paper sensor;

generating a print request signal upon reception of a unit of said data comprising up to one page of said data;

printing the data on the paper when said print request signal is generated after the paper is registered with said registration rollers; and feeding and registering a next paper from said paper cassette prior to generation of a subsequent print request signal.

7. A method for controlling paper conveyance of an electrophotographic reproduction device for receiving print data to be printed from an external device through a data transmission medium, said method comprising the steps of:

generating a request to convey a printable medium upon initiation of reception of said print data;

feeding the printable medium from a cassette to a predetermined position for registration upon said reception of the print data transmitted through said data transmission medium and registering said printable medium at said predetermined position; and generating a print request signal when said print data received reaches a set unit amount of print data comprising up to one page of said print data; and beginning printing of the print data received on said printable medium in response to said print request signal.

8. The method of claim 7, comprised of printing images corresponding to said print data on the printable medium during reception of said print data other than said set unit amount.

9. The method of claim 7, comprised of repeating said feeding step with a subsequent sheet of the printable medium to said predetermined position upon a reception of print data of the next sheet of the printable medium subsequent to said initial reception of said print data.

10. The method of claim 7, further comprising beginning the printing of subsequent images on the printable medium after reception of said initial reception of said print data.

11. The method of claim 7, wherein the step of printing is performed with a laser beam printer.

12. An apparatus for controlling paper conveyance of an electrophotographic reproduction device which receives input data to be printed on a printable medium from an external device through a data transmission medium, said apparatus comprising:

means for generating a paper feeding request signal upon initial reception of said input data to be printed on said printable medium through said data transmission medium; and means for feeding said printable medium to a predetermined position and registering said printable medium at said predetermined position in response to said paper feeding request signal, and for printing said input data on the printable medium when said printable medium is in said predetermined position and received data reaches a set unit amount of print data.

13. The apparatus of claim 12, comprised of printing images corresponding to said print data upon the printable medium during reception of said print data other than said set unit amount.

14. The apparatus of claim 12, comprised of again feeding a next sheet of the printable medium to said predetermined position upon a subsequent of said initial reception of said print data.

15. The apparatus of claim 12, further comprised of said input data to be printed on said printable medium being transmitted from a workstation.

16. The apparatus of claim 12, further comprised of said electrophotographic reproduction device being a laser beam printer.

17. A page printer, comprising:

control means for receiving print data that is printed on a printable medium from an external device, said control means generating a feeding request signal to feed a sheet of the printable medium upon initial reception of the print data and subsequently generating a print request signal for printing images corresponding to said print data received when said print data received reaches a set unit amount of said print data comprising less than or equal to one page of said print data on the printable medium;

engine means for printing said print data received by said control means on the printable, medium, said engine means comprising:

means for feeding the printable medium from a feeding position into a predetermined position and registering the printable medium at said predetermined position in response to reception of said feeding request signal; and means for beginning printing the images corresponding to said print data received by said control means on the printable medium in response to reception of said print request signal subsequent to said feeding request signal.

18. A page printer, comprising:

a paper cassette for storing a plurality of papers;

convey means for feeding the papers from said paper cassette into a registration position and for registering each sheet of papers at said registration position;

control means for receiving print data that is printed, said control means generating a feed request signal upon initial reception of said print data and subsequently generating a print request signal for requesting printing of images corresponding to said print data when said print data received reaches a set unit amount of said print data comprising less than or equal to one page of said print data; and print means for enabling said convey means to feed a first sheet of papers from said paper cassette into said registration position and register said first sheet at said registration upon reception of said feed request signal and for printing the images corresponding to said print data on the first sheet of papers upon reception of said print request signal subsequent to said feed request signal, and for enabling said convey means to feed a next sheet of papers from said paper cassette into said registration position and register the next sheet of papers at said registration position prior to generation of a next print request signal by said control means.

19. The page printer of claim 18, wherein said print means prints the images corresponding to said print data upon each sheet of papers during reception of said print data after reception of said print request signal and synchronization between said control means and said print means.

20. The page printer of claim 18, further of said control means returning to a standby mode for preparing to receive the print data to be printed onto a next sheet of papers prior to generating a next feed request signal.

21. A method for controlling conveyance of printable media within an image formation device comprising the steps of:

initializing said device to place said device in a state of readiness to print images corresponding to print data upon the printable media;

generating a request to convey the printable media within said device upon initiation of reception of said print data;

feeding a first sheet of the printable medium from said paper cassette to a predetermined position and registering said printable medium at said predetermined position after said initializing of said device;

generating a print request signal when said control unit has received a set unit amount up to one full page of said print data;

synchronizing said control unit and said engine unit;

printing said print data on the printable medium in response to reception of said print request signal;

feeding and registering a second sheet of the printable medium from said paper cassette, for performing a next printing operation; and generating said print request signal when said control unit has again received said set unit amount up to one full page of said print data.

22. A method for controlling paper conveyance of a page printer comprising a paper cassette for storing papers, a pickup roller for picking up each sheet of papers stored in the paper cassette, feeding rollers for feeding each sheet of papers picked up by said pickup roller into a registration position, registration rollers for registering each sheet of papers fed by said feeding roller, a photosensitive drum for printing images corresponding to print data to be printed on each sheet of papers registered by said registration rollers, and a controller coupled to receive print data to be printed for generating a feed request signal to enable operation of said feeding rollers and generating a print request signal to enable operation of said registration rollers, said method comprising the steps of:

generating said feed request signal when said controller first receives the print data corresponding to images to be printed on a first sheet of papers;

beginning feeding the first sheet of papers from said paper cassette to said registration position by said feeding rollers and registering the first sheet of papers at said predetermined position by said registration rollers upon reception of said feed request signal;

generating said print request signal when said controller finally receives all of the print data to be printed on the first sheet of papers;

printing the print data received by said controller on the first sheet of papers by said photosensitive drum upon reception said print request signal;

returning said controller to a standby mode for preparing to receive the print data corresponding to images to be printed on a next sheet of paper;

again generating a next feed request signal when said controller first receives the print data corresponding to images to be printed on a next sheet of papers;

feeding and registering the second sheet of papers from said paper cassette by said pickup roller and said registration rollers upon reception of said next feed request signal;

again generating a next print request signal when said controller finally receives all of the print data to be printed on the next sheet of papers; and printing the print data received by said controller on the next sheet of papers by said photosensitive drum upon reception said next print request signal.

* * * * *